United States Patent
Ito

(10) Patent No.: US 8,532,212 B2
(45) Date of Patent: Sep. 10, 2013

(54) WIRELESS COMMUNICATION SYSTEM, WIRELESS COMMUNICATION DEVICE, WIRELESS COMMUNICATION METHOD AND COMPUTER PROGRAM

(75) Inventor: Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 12/576,592

(22) Filed: Oct. 9, 2009

(65) Prior Publication Data

US 2010/0091897 A1    Apr. 15, 2010

(30) Foreign Application Priority Data

Oct. 10, 2008    (JP) ................................ 2008-264110

(51) Int. Cl.
*H04B 7/02*    (2006.01)
*H04L 1/02*    (2006.01)

(52) U.S. Cl.
USPC ............ 375/267; 375/260; 375/299; 375/347

(58) Field of Classification Search
USPC .......... 375/260, 267, 299, 347; 370/203–211
See application file for complete search history.

(56) References Cited

U.S. PATENT DOCUMENTS

| 2006/0121946 | A1* | 6/2006 | Walton et al. | 455/561 |
| 2007/0253501 | A1 | 11/2007 | Yamaura | |
| 2007/0286303 | A1 | 12/2007 | Yamaura | |
| 2008/0256410 | A1* | 10/2008 | Park et al. | 714/748 |
| 2008/0267138 | A1* | 10/2008 | Walton et al. | 370/336 |
| 2009/0046009 | A1* | 2/2009 | Fujii | 342/373 |

FOREIGN PATENT DOCUMENTS

| JP | 7-38539 | 2/1995 |
| JP | 2006-319959 | 11/2006 |
| JP | 2007-74318 | 3/2007 |
| JP | 2007-318727 | 12/2007 |
| JP | 2007-318728 | 12/2007 |
| JP | 2007-318729 | 12/2007 |
| WO | WO 2007/126036 A1 | 11/2007 |

* cited by examiner

*Primary Examiner* — Curtis Odom
(74) *Attorney, Agent, or Firm* — Sony Corporation

(57) ABSTRACT

There is provided a wireless communication system, including a first terminal equipped with N antennas, N being an integer of at least two, a second terminal equipped with M antennas, M being an integer of at least one, and a third terminal equipped with L antennas, L being an integer of at least one. The first terminal includes a matrix calculation portion that calculates a transmission weight matrix suitable for transmitting data from the first terminal to the second terminal, and a matrix multiplication portion that multiplies a first data stream and a second data stream by the transmission weight matrix, the first data stream being transmitted from the first terminal to the second terminal, and the second data stream being transmitted from the first terminal to the third terminal.

12 Claims, 10 Drawing Sheets

WIRELESS COMMUNICATION SYSTEM, WIRELESS COMMUNICATION DEVICE, WIRELESS COMMUNICATION METHOD AND COMPUTER PROGRAM

BACKGROUND OF THE INVENTION

1. Field of the Invention

The present invention generally relates to a wireless communication system, a wireless communication device, a wireless communication method and a computer program. The present invention particularly relates to a wireless communication system, a wireless communication device, a wireless communication method and a computer program that are capable of simultaneously transmitting data to a plurality of terminals.

2. Description of the Related Art

Typical examples of wireless local area network (LAN) systems include IEEE802.11a and IEEE802.11b/g that are standardized by the Institute of Electrical and Electronic Engineers (IEEE). In the IEEE802.11a/g wireless LAN system, an orthogonal frequency division multiplexing (OFDM) system is used, which provides high frequency use efficiency and which is robust against frequency selective fading. The maximum bit rate in the IEEE802.11a/g wireless LAN system is 54 Mbps.

However, in the next generation of wireless LAN systems, a higher bit rate is desired. To address this, in the IEEE systems, IEEE802.11n that uses a multi-input multi-output (MIMO) communication system is being standardized.

In the MIMO communication system, the transmission capacity can be increased in accordance with the number of antennas, without increasing the frequency band. For example, if it is assumed that the number of antennas on the transmission side is N and the number of antennas on the receiving side is M, data transmission can be performed using streams that are spatially multiplexed between a transmitter and a receiver, and it is possible to form spatial streams corresponding to the smaller number (MIN [N, M]) of the transmission and reception antennas. In summary, the transmission capacity can be increased up to MIN [N, M] times with respect to a known transmission system that is not spatially multiplexed.

Mathematical expressions and the like that relate to the MIMO communication system are described in Japanese Patent Application Publication No. JP-A-2007-318727, Japanese Patent Application Publication No. JP-A-2007-318728 and Japanese Patent Application Publication No. JP-A-2007-318729. As described in JP-A-2007-318727, JP-A-2007-318728 and JP-A-2007-318729, the MIMO communication system estimates a channel matrix H of transmission paths using a given method, and multiplies signals by an antenna weight matrix on both the transmitter and receiver sides (in some cases, only on the receiver side), thereby achieving space multiplexing transmission.

Further, Japanese Patent Application Publication No. JP-A-2007-74318 discloses a technology that improves effective speed in a wireless network by suppressing interference within the same cell in downlink, in the next generation of wireless communication system in which a plurality of antennas are used and a plurality of mobile stations perform communication at the same time using the same frequency.

SUMMARY OF THE INVENTION

As one of the methods that perform multiplication by transmission antenna weight on the transmitter side, there is an SVD-MIMO system that utilizes singular value decomposition (SVD) of the channel matrix H. In the SVD-MIMO system, a matrix V that is obtained by performing the singular value decomposition of the channel matrix H is used as a transmission antenna weight matrix, and a data signal x that is desired to be transmitted is multiplied by the matrix V, thereby generating a transmission signal x'.

However, in the known art, modulation scheme assignment of each element of the data signal x that is desired to be transmitted is determined based on differences in magnitude of singular values $\lambda$, which are elements of a diagonal matrix D obtained by performing the singular value decomposition of the channel matrix H. Therefore, even if equivalent transmission power is consumed for transmission, there is an element that can only send signals of a low transmission rate to the receiver side.

In light of the foregoing, it is desirable to provide a novel and improved wireless communication system, wireless communication device, wireless communication method and computer program capable of using transmission power more efficiently for data transmission.

According to an embodiment of the present invention, there is provided a wireless communication system, including a first terminal equipped with N antennas, N being an integer of at least two, a second terminal equipped with M antennas, M being an integer of at least one, and a third terminal equipped with L antennas, L being an integer of at least one. The first terminal includes a matrix calculation portion that calculates a transmission weight matrix suitable for transmitting data from the first terminal to the second terminal, and a matrix multiplication portion that multiplies a first data stream and a second data stream by the transmission weight matrix, the first data stream being transmitted from the first terminal to the second terminal, and the second data stream being transmitted from the first terminal to the third terminal.

According to such configuration, a first terminal equipped with N antennas, a second terminal equipped with M antennas, a third terminal equipped with L antennas. In the first terminal, a matrix calculation portion calculates a transmission weight matrix suitable for transmitting data from the first terminal to the second terminal, and a matrix multiplication portion multiplies a first data stream and a second data stream by the transmission weight matrix, the first data stream being transmitted from the first terminal to the second terminal, and the second data stream being transmitted from the first terminal to the third terminal. As a result, there is capable of using transmission power more efficiently for data transmission.

The first data stream may be mapped according to a modulation scheme assigned based on a singular value decomposition (SVD)-multi-input multi-output (MIMO) system, and the second data stream may be mapped according to a modulation scheme determined in advance between the first terminal and the third terminal.

The first terminal may transmit, once in a plurality of times, only data addressed to the third terminal.

The third terminal may send back, to the first terminal, information indicating that data has been received correctly, collectively for a plurality of data.

The third terminal may send back, to the first terminal, information indicating that data has been received correctly, collectively for a plurality of data, at a time point when the first terminal transmits only data addressed to the third terminal.

Based on information from the third terminal indicating that data has been received correctly, the first terminal may preferentially retransmit data that has not been received by the third terminal.

The first data stream received by the second terminal and the second data stream received by the third terminal may be combined and used.

Information from the second terminal indicating that data has been received correctly, and information from the third terminal indicating that data has been received correctly may be shared by each other, and the information including also the information of a sharing counterpart is transmitted from one of the M antennas and the L antennas.

According to another embodiment of the present invention, there is provided a wireless communication device, including N antennas, N being an integer of at least two, a matrix calculation portion that calculates a transmission weight matrix suitable for transmitting data to a first terminal equipped with M antennas, M being an integer of at least one, and a matrix multiplication portion that multiplies a first data stream and a second data stream by the transmission weight matrix, the first data stream being transmitted to the first terminal, and the second data stream being transmitted to a second terminal equipped with L antennas, L being an integer of at least one.

The first data stream may be mapped according to a modulation scheme assigned based on an SVD-MIMO system, and the second data stream may be mapped according to a modulation scheme determined in advance with the second terminal.

The N antennas may transmit, once in a plurality of times, only data addressed to the second terminal.

Based on information from the second terminal indicating that data has been received correctly, the N antennas may preferentially retransmit data that has not been received by the second terminal.

According to another embodiment of the present invention, there is provided a wireless communication method, including the steps of calculating a transmission weight matrix suitable for transmitting data from N antennas, N being an integer of at least two, to a first terminal equipped with M antennas, M being an integer of at least one, and multiplying a first data stream and a second data stream by the transmission weight matrix, the first data stream being transmitted to the first terminal, the second data stream being transmitted to a second terminal equipped with L antennas, L being an integer of at least one.

According to another embodiment of the present invention, there is provided a computer program that comprises instructions that command a computer to execute the steps of calculating a transmission weight matrix suitable for transmitting data from N antennas, N being an integer of at least two, to a first terminal equipped with M antennas, M being an integer of at least one, and multiplying a first data stream and a second data stream by the transmission weight matrix, the first data stream being transmitted to the first terminal, the second data stream being transmitted to a second terminal equipped with L antennas, L being an integer of at least one.

According to the embodiments of the present invention described above, there are provided the wireless communication system, the wireless communication device, the wireless communication method and the computer program that are novel and improved and that are capable of using transmission power more efficiently for data transmission. More specifically, the first data stream to be transmitted from the first terminal to the second terminal and the second data stream to be transmitted from the first terminal to the third terminal are both multiplied by the transmission weight matrix suitable for transmitting data from the first terminal to the second terminal. Thus, transmission power can be used more efficiently for data transmission.

DETAILED DESCRIPTION OF THE INVENTION

Figure 1:
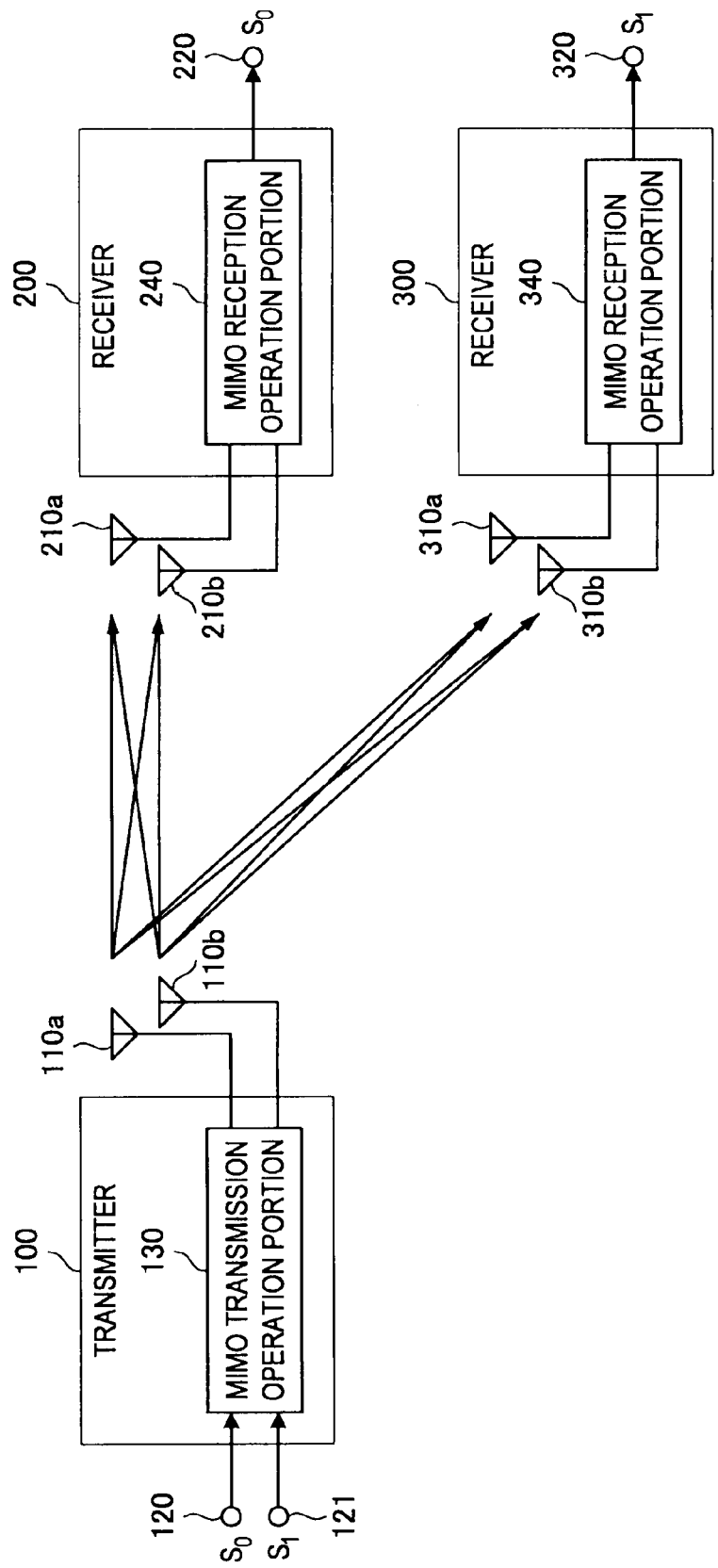
FIG. 1 is an explanatory diagram illustrating a configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in detail in the following order.

1. Explanation of a Wireless Communication System That Uses a Known SVD-MIMO System 2. Explanation of a Wireless Communication System According to an Embodiment of the Present Invention
   2-1. Configuration of the Wireless Communication System According to the Embodiment of the Present Invention
   2-2. Operation of the Wireless Communication System According to the Embodiment of the Present Invention 3. Explanation of a Modified Example of the Wireless Communication System According to the Embodiment of the Present Invention 4. Conclusion 1. Explanation of a Wireless Communication System that Uses a Known SVD-MIMO System First, a wireless communication system that uses a known SVD-MIMO system will be explained.

As described above, in the SVD-MIMO system, the matrix V that is obtained by performing the singular value decomposition of the channel matrix H is used as a transmission antenna weight matrix, and the data signal x that is desired to be transmitted is multiplied by the matrix V, to thereby generate the transmission signal x'. The transmission signal x' passes through a transmission path of the channel matrix H, and is received as a received signal y' on the receiver side.

On the receiver side, a matrix U that is also obtained by performing the singular value decomposition of the channel matrix H is used as a reception antenna weight matrix, and a data signal y that is received by multiplying the received signal y' with the matrix U is generated. After noise components have been removed from the received data signal y, the resultant portion of the received data signal y can be expressed as Dx, by utilizing the diagonal matrix D that is also obtained by performing the singular value decomposition of the channel matrix H. Note that the diagonal matrix D is a diagonal matrix that has, as a diagonal element, the square root of each of the singular values λ obtained by the singular value decomposition. Thus, depending on the magnitude of the singular values, attained communication quality of each element of the data signal x that is desired to be transmitted varies in each element of the received data signal y. In the SVD-MIMO system, the modulation scheme assignment of each element of the data signal x that is desired to be transmitted is performed based on this communication quality, thereby improving the communication quality efficiently.

Theoretically, it is possible to obtain the maximum communication capacity by performing such modulation scheme assignment.

Figure 8:
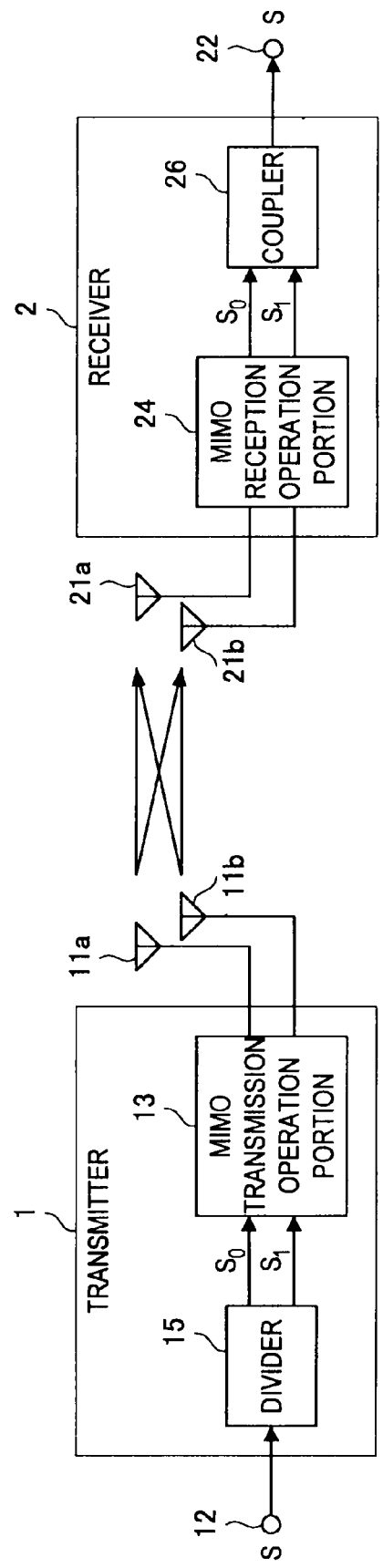
FIG. 8 is an explanatory diagram illustrating a configuration of a known wireless communication system.

FIG. 8 is an explanatory diagram illustrating a configuration of a known wireless communication system. As shown in FIG. 8, the known wireless communication system includes a transmitter 1 and a receiver 2. The transmitter 1 includes antennas 11a and 11b, a data input/output terminal 12, a MIMO transmission operation portion 13 and a divider 15. The receiver 2 includes antennas 21a and 21b, a data input/output terminal 22, a MIMO reception operation portion 24 and a coupler 26.

First, a connection relationship between the transmitter 1 and the receiver 2 will be explained. The data input/output terminal 12 is connected to the divider 15 provided inside the transmitter 1. The divider 15 is connected to the MIMO transmission operation portion 13. The MIMO transmission operation portion 13 is connected to the antennas 11a and 11b. The antennas 21a and 21b are connected to the MIMO reception operation portion 24 provided inside the receiver 2. The MIMO reception operation portion 24 is connected to the coupler 26. The coupler 26 is connected to the data input/output terminal 22.

Next, operations of the transmitter 1 and the receiver 2 will be explained. Data S for transmitting to the receiver 2 is input to the divider 15 provided inside the transmitter 1. The divider 15 divides the data S into data $S_0$ and data $S_1$ based on the ratio between a modulation scheme for $S_0$ and a modulation scheme for $S_1$ that are derived in advance by the channel matrix H between the transmitter 1 and the receiver 2. Then, the divider 15 outputs the data $S_0$ and the data $S_1$ to the MIMO transmission operation portion 13.

The MIMO transmission operation portion 13 performs matrix operation processing on the data $S_0$ and $S_1$ that are mapped according to the modulation schemes assigned based on the concept of the SVD-MIMO system, using the matrix V that is obtained in advance by performing the singular value decomposition of the channel matrix H between the transmitter 1 and the receiver 2. The MIMO transmission operation portion 13 generates the transmission signals x' to be transmitted from the antennas 11a and 11b, by performing the matrix operation processing. The transmission signals x' generated by the MIMO transmission operation portion 13 are sent to the antennas 11a and 11b, and output from the antennas 11a and 11b to wireless transmission paths.

The receiver 2 sends, to the MIMO reception operation portion 24, the received signals y' that are received by the antennas 21a and 21b through the wireless communication paths. The MIMO reception operation portion 24 performs matrix operation processing on the input received signals y', using the matrix U that is obtained in advance by performing the singular value decomposition of the channel matrix H between the transmitter 1 and the receiver 2 (or using an inverse matrix calculated from the received signals y'). The data $S_0$ and $S_1$ are generated by the matrix operation processing performed by the MIMO reception operation portion 24, and output to the coupler 26. The coupler 26 combines the data series of the data $S_0$ and $S_1$ input from the MIMO reception operation portion 24, in accordance with the ratio between the modulation schemes used for modulating the data S0 and the data S1, respectively, and outputs the resultant data to the data input/output terminal 22.

Figure 9:
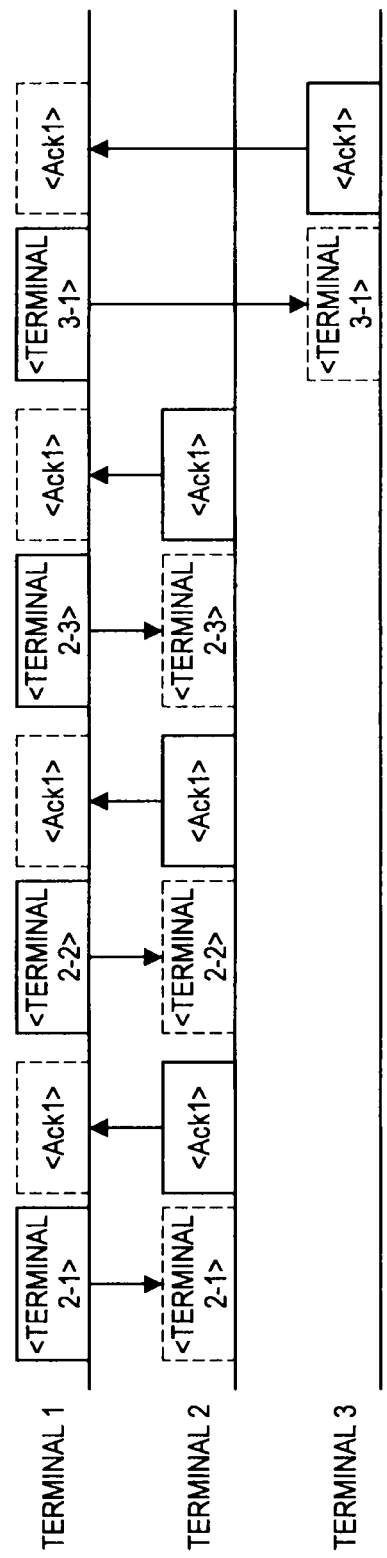
FIG. 9 is an explanatory diagram illustrating a transmission/reception timing relationship in the known wireless communication system.

FIG. 9 is an explanatory diagram illustrating a transmission/reception timing relationship in the known wireless communication system. With reference to FIG. 9, a case will be explained in which a terminal 1 corresponds to the transmitter 1 in FIG. 8, and a terminal 2 and a terminal 3 correspond to the receiver 2 in FIG. 8 (i.e., a case in which there are two receivers 2 in the wireless communication system shown in FIG. 8).

First, a notation system used in FIG. 9 will be explained. In FIG. 9, transmission/reception states of the "terminal 1", the "terminal 2" and the "terminal 3" are shown, and each horizontal axis represents passage of time. The data "<terminal 2-1>" on the right side of the "terminal 1" is surrounded by the solid line, and this indicates a signal transmitted from the terminal 1. Further, at the same time point, the data "<terminal 2-1>" surrounded by the broken line is present in the "terminal 2", and this indicates that the terminal 2 has received the signal (in other words, the data has been output to the data input/output terminal). The data denoted by "<terminal *-*>" is a signal indicating transmission data, and the data denoted by "<Ack*>" is a response signal for notifying the transmission side that each data has been received successfully. Note that the first subscript of each signal indicates the destination terminal number, and if there is the second subscript, it indicates the packet number of the signal series.

Next, referring to FIG. 9, the transmission/reception timing relationship in the known wireless communication system will be explained as a time series. First, the data "<terminal 2-1>" for the terminal 2 is transmitted from the terminal 1. The terminal 2 receives the data "<terminal 2-1>" transmitted from the terminal 1. Next, the terminal 2 transmits the data "<Ack1>" in order to notify the terminal 1 that the data "<terminal 2-1>" has been received correctly. When the terminal 1 receives the data "<Ack1>" transmitted from the terminal 2, it can confirm that the terminal 2 has correctly received the data "<terminal 2-1>" for the terminal 2.

Continuously, the data "<terminal 2-2>" for the terminal 2 is transmitted from the terminal 1. The terminal 2 receives the data "<terminal 2-2>" transmitted from the terminal 1. Next, the terminal 2 transmits the data "<Ack1>" in order to notify the terminal 1 that the data "<terminal 2-2>" transmitted from the terminal 1 has been received successfully. The terminal 1 receives the data "<Ack1>" transmitted from the terminal 2.

In a similar manner, the data "<terminal 2-3>" for the terminal 2 is transmitted from the terminal 1. The terminal 2 receives the data "<terminal 2-3>" transmitted from the terminal 1. Next, the terminal 2 transmits the data "<Ack1>" in order to notify the terminal 1 that the data "<terminal 2-3>" transmitted from the terminal 1 has been received successfully. The terminal 1 receives the data "<Ack1>" transmitted from the terminal 2. Then, the data "<terminal 3-1>" for the terminal 3 is transmitted from the terminal 1. The terminal 3 receives the data "<terminal 3-1>" transmitted from the terminal 1. Next, the terminal 3 transmits the data "<Ack1>" in order to notify the terminal 1 that the data "<terminal 3-1>" has been received successfully. The terminal 1 receives the data "<Ack1>" transmitted from the terminal 3.

Specific operations will be explained separately for each terminal. First, at the terminal 1, a general protocol, namely a "method to transmit the next data when Ack is received" is used for data transmission to the terminal 2. Further, the general protocol, the "method to transmit the next data when Ack is received" is also used for data transmission to the terminal 3.

At the terminal 2, a general protocol, namely a "method to send back Ack when data is received successfully" is used for data reception from the terminal 1. Also at the terminal 3, the general protocol, the "method to send back Ack when data is received successfully" is used for data reception from the terminal 1.

In the transmission/reception timing relationship in the known wireless communication system, data transmission to one terminal is performed in one transmission, and the terminal that has received the data sends Ack back to the transmission source sequentially when the data is received successfully. If Ack is not received on the transmission side and time out occurs, retransmission is performed a plurality of times (in some cases, retransmission is not performed). If retransmission time out occurs, the corresponding data packet is discarded, and transmission of the next data packet is performed.

Figure 10:
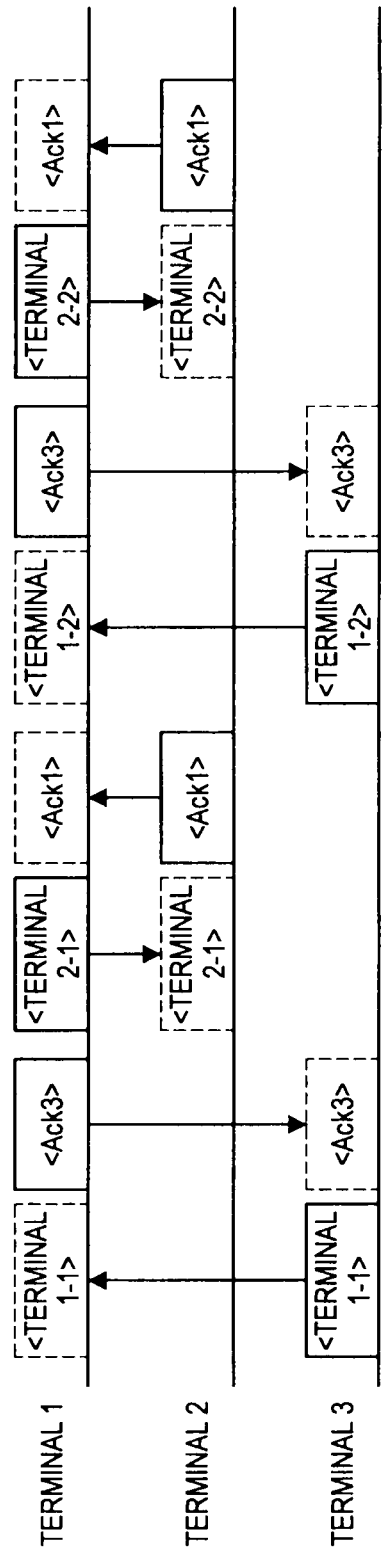
FIG. 10 is an explanatory diagram illustrating a transmission/reception timing relationship in the known wireless communication system.

FIG. 10 is an explanatory diagram illustrating a transmission/reception timing relationship in the known wireless communication system. With reference to FIG. 10, in a similar manner to FIG. 9, a case will be explained in which the terminal 1 corresponds to the transmitter 1 in FIG. 8, and the terminal 2 and the terminal 3 correspond to the receiver 2 in FIG. 8 (i.e., a case in which there are two receivers 2 in the wireless communication system).

A notation system used in FIG. 10 is the same as the notation system used in FIG. 9, and a detailed explanation is therefore omitted.

Next, referring to FIG. 10, the transmission/reception timing relationship in the known wireless communication system will be explained as a time series. First, the data "<terminal 1-1>" for the terminal 1 is transmitted from the terminal 3. The terminal 1 receives the data "<terminal 1-1>" transmitted from the terminal 3. Next, the terminal 1 transmits the data "<Ack3>" in order to notify the terminal 3 that the data "<terminal 1-1>" has been received successfully. The terminal 3 receives the data "<Ack3>" transmitted from the terminal 1.

Continuously, the data "<terminal 2-1>" for the terminal 2 is transmitted from the terminal 1. The terminal 2 receives the data "<terminal 2-1>" transmitted from the terminal 1. Next, the terminal 2 transmits the data "<Ack1>" in order to notify the terminal 1 that the data "<terminal 2-1>" transmitted from the terminal 1 has been received successfully. The terminal 1 receives the data "<Ack1>" transmitted from the terminal 2.

In a similar manner, the data "<terminal 1-2>" for the terminal 1 is transmitted from the terminal 3. The terminal 1 receives the data "<terminal 1-2>" transmitted from the terminal 3. Next, the terminal 1 transmits the data "<Ack3>" in order to notify the terminal 3 that the data "<terminal 1-2>" transmitted from the terminal 3 has been received successfully. The terminal 3 receives the data "<Ack3>" transmitted from the terminal 1. Continuously, the data "<terminal 2-2>" for the terminal 2 is transmitted from the terminal 1. The terminal 2 receives the data "<terminal 2-2>" transmitted from the terminal 1. Next, the terminal 2 transmits the data "<Ack1>" in order to notify the terminal 1 that the data "<terminal 2-2>" has been received successfully. The terminal 1 receives the data "<Ack1>" transmitted from the terminal 2.

Specific operations will be explained separately for each terminal. First, at the terminal 1, the general protocol, the "method to transmit the next data when Ack is received" is used for data transmission to the terminal 2. Further, the general protocol, the "method to send back Ack when data is received successfully" is used for data reception from the terminal 3.

At the terminal 2, the general protocol, the "method to send back Ack when data is received successfully" is used for data reception from the terminal 1. Also at the terminal 3, the general protocol, the "method to transmit the next data when Ack is received" is used for data transmission to the terminal 1.

In the transmission/reception timing relationship in the known wireless communication system, after performing transmission for sending back Ack, if there is new data to be transmitted from the terminal itself, it is necessary to perform transmission processing according to a series of transmission procedures. In FIG. 10, the transmission of the data "<terminal 2-*>" after the data "<Ack3>" has been transmitted from the terminal 1 corresponds to the above case. Accordingly, when it is necessary to transmit data to a plurality of terminals, the data cannot be simultaneously transmitted, resulting in reduced communication efficiency.

The modulation scheme assignment of each element of the data signal x that is desired to be transmitted is determined based on differences in magnitude of the singular values λ that are elements of the diagonal matrix D. Therefore, even if equivalent transmission power is consumed for transmission, there is an element that can only send signals of a low transmission rate to the receiver side.

To address this, the present invention makes it possible to simultaneously transmit different data to a plurality of terminals on the receiving side. Thus, transmission power can be used for data transmission more efficiently, and also an efficient communication protocol can be formed.

2. Explanation of a Wireless Communication System According to an Embodiment of the Present Invention Hereinafter, the exemplary embodiment of the present invention will be explained using examples.

2-1. Configuration of the Wireless Communication System According to the Embodiment of the Present Invention FIG. 1 is an explanatory diagram illustrating a configuration of the wireless communication system according to the embodiment of the present invention. Hereinafter, the configuration of the wireless communication system according to the embodiment of the present invention will be explained with reference to FIG. 1.

As shown in FIG. 1, the wireless communication system according to the embodiment of the present invention includes a transmitter 100, and receivers 200 and 300.

The transmitter 100 includes antennas 110a and 110b, data input/output terminals 120 and 121, and a MIMO transmission operation portion 130. The receiver 200 includes antennas 210a and 210b, a data input/output terminal 220 and a MIMO reception operation portion 240. Similarly, the receiver 300 includes antennas 310a and 310b, a data input/output terminal 320 and a MIMO reception operation portion 340.

Here, referring to FIG. 1, a connection relationship between the transmitter 100, the receiver 200 and the receiver 300 will be explained. The data input/output terminals 120 and 121 are connected to the MIMO transmission operation portion 130 provided inside the transmitter 100. The MIMO transmission operation portion 130 is connected to the antennas 110a and 110b. The antennas 210a and 210b are connected to the MIMO reception operation portion 240 provided inside the receiver 200. The MIMO reception operation portion 240 is connected to the data input/output terminal 220. The antennas 310a and 310b are connected to the MIMO reception operation portion 340 provided inside the receiver 300. The MIMO reception operation portion 340 is connected to the data input/output terminal 320.

Next operations of the transmitter 100, the receiver 200 and the receiver 300 will be explained.

In the transmitter 100, data $S_0$ for transmitting to the receiver 200 and data $S_1$ for transmitting to the receiver 300 are respectively input, via the input/output terminals 120 and 121, to the MIMO transmission operation portion 130 provided inside the transmitter 100. The MIMO transmission operation portion 130 performs matrix operation processing on the data $S_0$ that is mapped according to a modulation scheme assigned based on the concept of the SVD-MIMO system, using the matrix V that is obtained in advance by performing the singular value decomposition of the channel matrix H between the transmitter 100 and the receiver 200. At the same time, the MIMO transmission operation portion 130 performs the matrix operation processing, using the matrix V, also on the data $S_1$ that is mapped according to a modulation scheme that is determined separately in advance between the transmitter 100 and the receiver 300. By performing the matrix operation processing, the MIMO transmission operation portion 130 generates transmission signals x' to be transmitted from the antennas 110a and 110b. The transmission signals x' generated by the MIMO transmission operation portion 130 are sent to the antennas 110a and 110b, and output to wireless transmission paths.

The receiver 200 sends, to the MIMO reception operation portion 240, received signals y' that are received by the antennas 210a and 210b through the wireless communication paths. The MIMO reception operation portion 240 performs matrix operation processing on the input received signals y', using the matrix U that is obtained in advance by performing the singular value decomposition of the channel matrix H between the transmitter 100 and the receiver 200 (or using an inverse matrix calculated from the received signals y'). Then, from among the data obtained as a result of the matrix operation processing performed by the MIMO reception operation portion 240, the MIMO reception operation portion 240 outputs, to the data input/output terminal 220, only the data $S_0$ that is data addressed to the receiver 200.

The receiver 300 sends, to the MIMO reception operation portion 340, received signals y'' that are received by the antennas 310a and 310b through the wireless communication paths. The MIMO reception operation portion 340 performs matrix operation processing on the input received signals y'', using an inverse matrix calculated from the received signals y''. From among the data obtained as a result of the matrix operation processing performed by the MIMO reception operation portion 340, the MIMO reception operation portion 340 outputs, to the data input/output terminal 320, only the data $S_1$ that is data addressed to the receiver 300.

It should be noted herein that, when only the data $S_0$ that is the data addressed to the receiver 200 is output by, for example, the transmitter 100, data that describes identification information indicating that the data $S_0$ is addressed to the receiver 200 may be added to the beginning portion of the data $S_0$. In a similar way, when only the data $S_1$ that is the data addressed to the receiver 300 is output by, for example, the transmitter 100, data that describes identification information indicating that the data $S_1$ is addressed to the receiver 300 may be added to the beginning portion of the data $S_1$.

Although not particularly shown in FIG. 1, the transmitter 100 is provided with an operation portion that has an equivalent function to the MIMO reception operation portions 240 and 340 that are respectively included in the receiver 200 and the receiver 300. Because the transmitter 100 is provided with the operation portion, when data is transmitted from the receiver 200 or the receiver 300, it can extract data by performing the matrix operation processing. In a similar way, the receiver 200 and the receiver 300 are provided with an operation portion that has an equivalent function to the MIMO transmission operation portion 130 included in the transmitter 100. Because the receiver 200 and the receiver 300 are provided with the operation portion, data can be transmitted from the receiver 200 or the receiver 300.

This completes the explanation of the configuration of the wireless communication system according to the embodiment of the present invention. Next, a configuration of the MIMO transmission operation portion 130 included in the transmitter 100 according to the embodiment of the present invention will be described.

Figure 2:
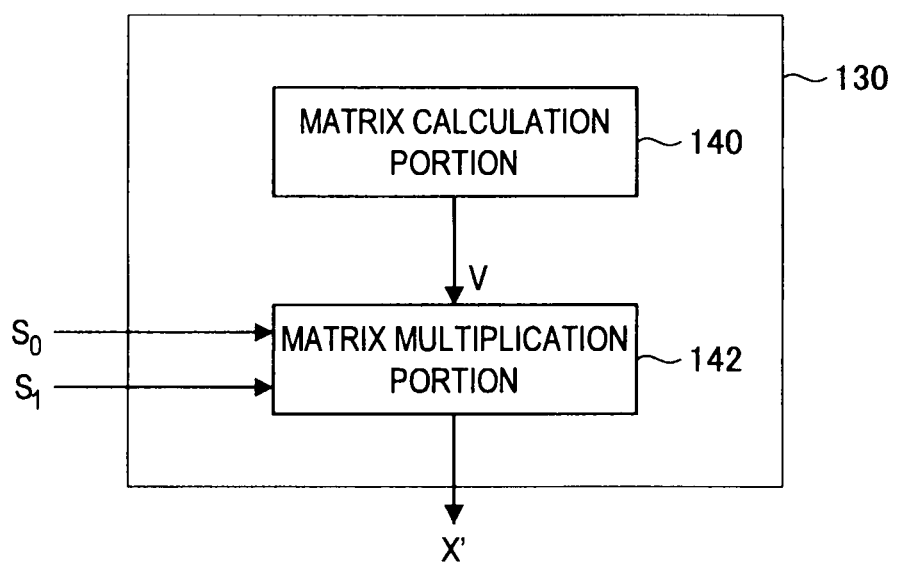
FIG. 2 is an explanatory diagram illustrating a configuration of a MIMO transmission operation portion 130.

FIG. 2 is an explanatory diagram illustrating the configuration of the MIMO transmission operation portion 130 included in the transmitter 100 according to the embodiment of the present invention. Hereinafter, the configuration of the MIMO transmission operation portion 130 will be explained with reference to FIG. 2.

As shown in FIG. 2, the MIMO transmission operation portion 130 included in the transmitter 100 according to the embodiment of the present invention includes a matrix calculation portion 140 and a matrix multiplication portion 142.

The matrix calculation portion 140 performs, in advance, singular value decomposition of the channel matrix H between the transmitter 100 and the receiver 200, and thereby generates the matrix V with two rows and two columns that is used in matrix operation processing in the matrix multiplication portion 142. The channel matrix H between the transmitter 100 and the receiver 200 can be estimated in advance using a known pattern (for example, a reference signal) transmitted by the receiver 200. A known method can be used as an estimation method of the channel matrix H, or as a method for generating the matrix V by performing the singular value decomposition of the channel matrix H. A detailed explanation of these methods is therefore omitted here.

The matrix multiplication portion 142 performs the matrix operation processing, using the matrix V generated by the matrix calculation portion 140, on the data $S_0$ that is the data addressed to the receiver 200 and that is mapped according to the modulation scheme assigned based on the concept of the SVD-MIMO system, and on the data $S_1$ that is the data addressed to the receiver 300 and that is mapped according to the modulation scheme determined separately in advance between the transmitter 100 and the receiver 300.

As a result of the matrix operation processing in the matrix multiplication portion 142, transmission signals x' to be transmitted from the antennas 110a and 110b are generated. The transmission signals x' generated by the matrix multiplication portion 142 include both the data addressed to the receiver 200 and the data addressed to the receiver 300. By transmitting such data from the antennas 110a and 110b, it is possible to improve communication efficiency.

In the present embodiment, the data $S_0$ is the data that is mapped according to the modulation scheme assigned based on the concept of the SVD-MIMO system. However, it is needless to mention that, in the present invention, the data $S_0$ is not limited to this example. Further, the data $S_1$ is the data that is mapped according to the modulation scheme determined separately in advance between the transmitter 100 and the receiver 300. However, it is needless to mention that, in the present invention, the data $S_1$ is not limited to this example.

This completes the explanation of the configuration of the MIMO transmission operation portion 130 included in the transmitter 100 according to the embodiment of the present invention. Next, an operation of the wireless communication system according to the embodiment of the present invention will be explained.

Figure 3:
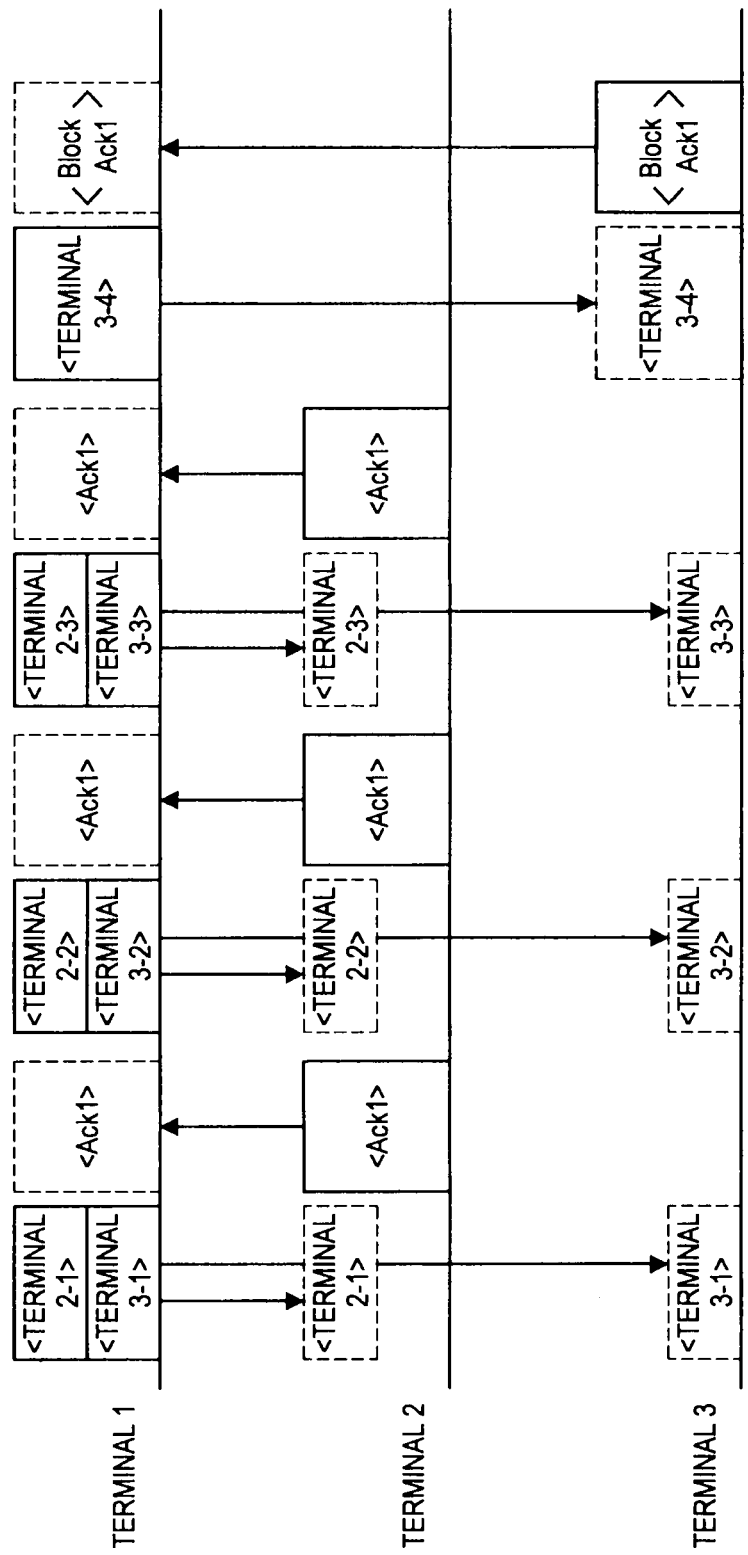
FIG. 3 is an explanatory diagram illustrating an example of a transmission/reception timing relationship in the wireless communication system according to the embodiment of the present invention.

2-2. Operation of the Wireless Communication System According to the Embodiment of the Present Invention FIG. 3 is an explanatory diagram illustrating an example of a transmission/reception timing relationship in the wireless communication system according to the embodiment of the present invention. Hereinafter, the transmission/reception timing relationship in the wireless communication system according to the embodiment of the present invention will be explained with reference to FIG. 3.

In FIG. 3, the "terminal 1" corresponds to the transmitter 100 in the wireless communication system shown in FIG. 1, the "terminal 2" corresponds to the receiver 200, and the "terminal 3" corresponds to the receiver 300.

First, a notation system used in FIG. 3 will be explained. In FIG. 3, transmission/reception states of the "terminal 1", the "terminal 2" and the "terminal 3" are shown, and each horizontal axis represents passage of time. The data "<terminal 2-1>" and the data "<terminal 3-1>" on the right side of the "terminal 1" that are surrounded by the solid line indicate signals transmitted from the terminal 1. The data "<terminal 2-1>" in the upper section corresponds to the data $S_0$ in FIG. 1, and the data "<terminal 3-1>" in the lower section corresponds to the data $S_1$ in FIG. 1. Further, at the same time point, the data "<terminal 2-1>" surrounded by the broken line is present in the "terminal 2" and the data "<terminal 3-1>" surrounded by the broken line is present in the "terminal 3", and these data indicate that the terminal 2 and the terminal 3 have received signals addressed thereto (in other words, these data have been output to the data input/output terminals). Further, the data denoted by "<terminal *-*>" is a signal indicating the content of the transmission data, and the data denoted by "<Ack*>" or "<BlockAck*>" is a response signal for notifying the transmission side that each data has been received successfully. Note that the first subscript of each signal indicates the destination terminal number, and if there is the second subscript, it indicates the packet number of the signal series. The signals that are not dividedly shown in the upper and lower sections, such as "<Ack*>", indicate that they are signals that have been transmitted/received using a known system such as that shown in FIG. 8.

Next, referring to FIG. 3, the transmission/reception timing relationship in the wireless communication system according to the embodiment of the present invention will be explained as a time series.

First, the terminal 1 transmits data including the data "<terminal 2-1>" for the terminal 2 and the data "<terminal 3-1>" for the terminal 3 from the antennas 110a and 110b. The terminal 2 receives the data "<terminal 2-1>" via the antennas 210a and 210b, and the terminal 3 receives the data "<terminal 3-1>" via the antennas 310a and 310b. At this time, the MIMO reception operation portion 240 of the terminal 2 (the receiver 200) disregards or discards the data addressed to the terminal 3 (the receiver 300), and the MIMO reception operation portion 340 of the terminal 3 disregards or discards the data addressed to the terminal 2.

Next, the terminal 2 transmits the data "<Ack1>" from the antennas 210a and 210b, in order to notify the terminal 1 that the data "<terminal 2-1>" has been received successfully. The terminal 1 receives the data "<Ack1>" transmitted from the terminal 2, via the antennas 110a and 110b.

In response to the reception of the data "<Ack1>" sent back from the terminal 2, the terminal 1 transmits the data "<terminal 2-2>" for the terminal 2 and the data "<terminal 3-2>" for the terminal 3 from the antennas 110a and 110b. The terminal 2 receives the data "<terminal 2-2>" via the antennas 210a and 210b, and the terminal 3 receives the data "<terminal 3-2>" via the antennas 310a and 310b.

Next, the terminal 2 transmits the data "<Ack1>" from the antennas 210a and 210b, in order to notify the terminal 1 that the data "<terminal 2-2>" has been received successfully. The terminal 1 receives the data "<Ack1>" transmitted from the terminal 2, via the antennas 110a and 110b.

In a similar manner, in response to the reception of the data "<Ack1>" sent back from the terminal 2, the terminal 1 transmits the data "<terminal 2-3>" for the terminal 2 and the data "<terminal 3-3>" for the terminal 3 from the antennas 110a and 110b. The terminal 2 receives the data "<terminal 2-3>" via the antennas 210a and 210b, and the terminal 3 receives the data "<terminal 3-3>" via the antennas 310a and 310b.

Next, the terminal 2 transmits the data "<Ack1>" from the antennas 210a and 210b, in order to notify the terminal 1 that the data "<terminal 2-3>" has been received successfully. The terminal 1 receives the data "<Ack1>" transmitted from the terminal 2, via the antennas 110a and 110b.

Next, the terminal 1 transmits only the data "<terminal 3-4>" for the terminal 3 from the antennas 110a and 110b. The terminal 3 receives the data "<terminal 3-4>" via the antennas 310a and 310b. Then, the terminal 3 transmits the data "<BlockAck1>" from the antennas 310a and 310b, in order to notify the terminal 1 that the data "<terminal 3-1>" to "<terminal 3-4>" have been received successfully. The terminal 1 receives the data "<BlockAck1>" transmitted by the terminal 3, via the antennas 110a and 110b. Note that the terminal 2 may receive the data "<terminal 3-4>" via the antennas 210a and 210b. However, this is not the data addressed to the terminal 2. Therefore, even if the terminal 2 receives the data "<terminal 3-4>", the terminal 2 disregards or discards that data.

Note that, in the example shown in FIG. 3, the terminal 2 may receive the data "<BlockAck1>" transmitted by the terminal 3 for the terminal 1. Similarly, the terminal 2 disregards or discards that data. Further, the terminal 3 may receive the data "<Ack1>" transmitted by the terminal 2 for the terminal 1. Similarly, the terminal 3 disregards or discards that data.

Specific operations will be explained separately for each terminal.

At the terminal 1, the general protocol, the "method to transmit the next data when Ack is received" is used for data transmission to the terminal 2. Further, a protocol called BlockAck, namely a "method to collectively receive and process Ack for a plurality of data transmissions" is used for data transmission to the terminal 3. Note that there are separately determined various systems for processing, such as retransmission caused by the information of BlockAck collectively sent back from the terminal 3. They do not have a direct relationship with the present invention, and a detailed explanation is therefore omitted. As the number of the "plurality of data transmissions", a selected number can be determined in advance between the terminal 1 and the terminal 3. In the example shown in FIG. 3, when the terminal 3 receives data from the terminal 1 four times, the terminal 3 sends BlockAck back to the terminal 1 in response to the fourth reception.

The terminal 2 performs reception processing on the signals transmitted from the terminal 1, and while extracting only the data $S_0$ addressed to the terminal itself, the terminal 2 sequentially sends back the data "Ack" indicating successful reception to the terminal 1. Further, at a timing when data addressed to the terminal itself is not present (for example, at the timing when the data "<terminal 3-4>" is transmitted from the terminal 1), the terminal 2 remains in a standby state in a similar manner to the existing operation.

The terminal 3 performs reception processing on the signals transmitted from the terminal 1, and while extracting only the data $S_1$ addressed to the terminal itself, the terminal 3 waits to send the data "Ack" indicating successful reception. After receiving a determined number of data, which is determined in advance with the terminal 1, the terminal 3 collectively sends back the data "BlockAck". Note that, the number of received data for sending back BlockAck is "4" in FIG. 3. However, there are some cases in which the terminal 3 fails to receive the data "<terminal 3-1>" to "<terminal 3-3>" and the data "<terminal 3-4>". In such cases, the number of the received data may be different from the determined number of data that has been determined with the terminal 1. When there is a difference, occurrence of conflict with Ack that is sequentially sent back from the terminal 2 is conceivable. Therefore, in order to avoid the conflict, the terminal 3 may send the data "BlockAck" back to the terminal 1 only when the data addressed to the terminal itself is sent (in FIG. 3, when the data "<terminal 3-4>" is transmitted from the terminal 1).

With the use of the transmission/reception timing relationship in the wireless communication system according to the embodiment of the present invention shown in FIG. 3, it is possible to avoid the conflict between Acks sent back from the terminal 2 and the terminal 3. Further, with the use of the above-described transmission/reception timing relationship, it is possible to simultaneously transmit data to the terminal 2 and the terminal 3, while the transmission rate to each terminal is maintained evenly. Particularly, when the modulation scheme assigned to the data $S_1$ that is addressed to the terminal 3 is higher for transmission to the terminal 3 than for transmission to the terminal 2, an overall transmission rate at which data can be transmitted from the terminal 1 can be maintained at a high level. Thus, frequency use efficiency is expected to be improved.

Figure 4:
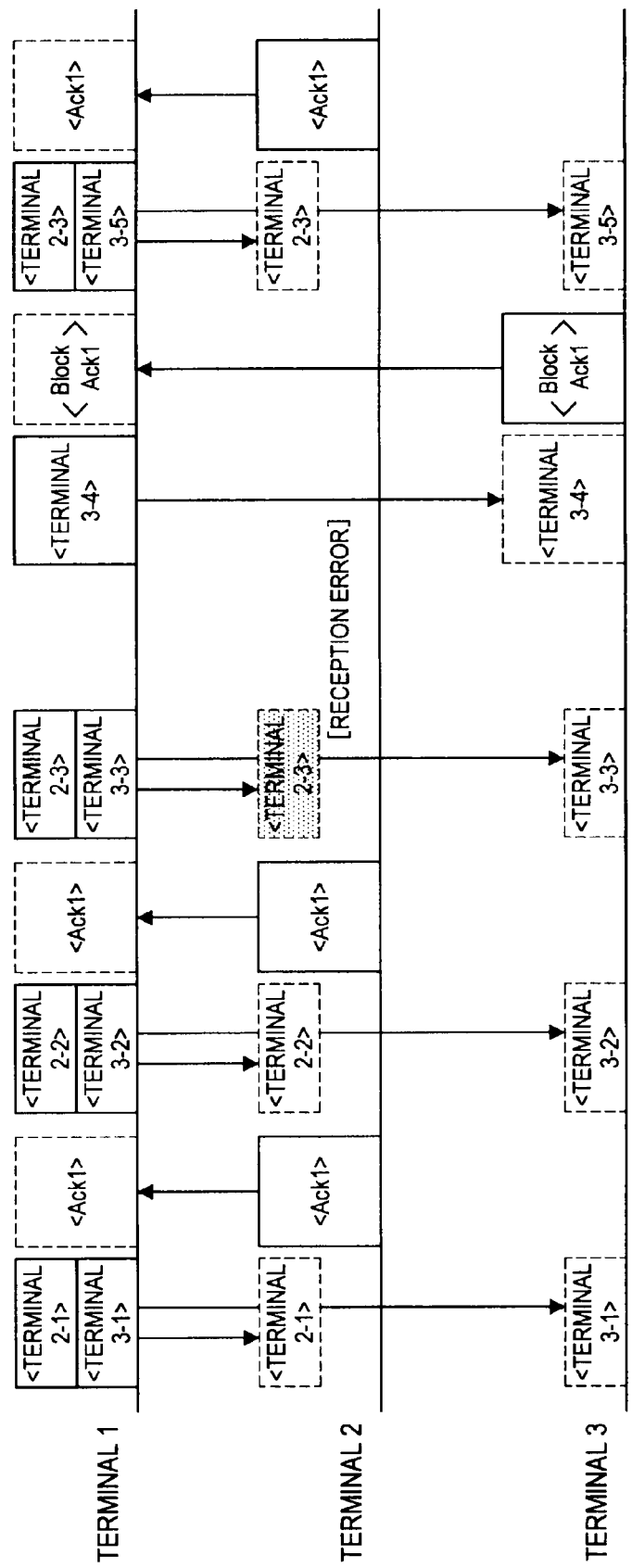
FIG. 4 is an explanatory diagram illustrating an example of the transmission/reception timing relationship in the wireless communication system according to the embodiment of the present invention.

The transmission/reception timing relationship in the wireless communication system according to the embodiment of the present invention is explained above with reference to FIG. 3. Next, another transmission/reception timing relationship will be explained. FIG. 4 is an explanatory diagram illustrating another example of the transmission/reception timing relationship in the wireless communication system according to the embodiment of the present invention. Hereinafter, the transmission/reception timing relationship in the wireless communication system according to the embodiment of the present invention will be explained with reference to FIG. 4.

FIG. 4 illustrates a case in which a reception error occurs in a portion of data in the transmission/reception timing relationship shown in FIG. 3.

First, a notation system used in FIG. 4 will be explained. Note that an explanation of the same portions as those in FIG. 3 is omitted. The data "<terminal 2-3>" indicates that it has not been correctly transmitted from the terminal 1 to the terminal 2 due to some reason such as noise, and a reception error has occurred. Note that the characters "[reception error]" are added to the data "<terminal 2-3>" as annotation.

Next, referring to FIG. 4, the transmission/reception timing relationship in the wireless communication system according to the embodiment of the present invention will be explained as a time series.

First, the terminal 1 transmits data including the data "<terminal 2-1>" for the terminal 2 and the data "<terminal 3-1>" for the terminal 3 from the antennas 110*a* and 110*b*. The terminal 2 receives the data "<terminal 2-1>" via the antennas 210*a* and 210*b*, and the terminal 3 receives the data "<terminal 3-1>" via the antennas 310*a* and 310*b*. At this time, the MIMO reception operation portion 240 of the terminal 2 (the receiver 200) disregards or discards the data addressed to the terminal 3 (the receiver 300), and the MIMO reception operation portion 340 of the terminal 3 disregards or discards the data addressed to the terminal 2.

Next, the terminal 2 transmits the data "<Ack1>" from the antennas 210*a* and 210*b*, in order to notify the terminal 1 that the data "<terminal 2-1>" has been received successfully. The terminal 1 receives the data "<Ack1>" transmitted from the terminal 2, via the antennas 110*a* and 110*b*.

In response to the reception of the data "<Ack1>" sent back from the terminal 2, the terminal 1 transmits the data "<terminal 2-2>" for the terminal 2 and the data "<terminal 3-2>" for the terminal 3 from the antennas 110*a* and 110*b*. The terminal 2 receives the data "<terminal 2-2>" via the antennas 210*a* and 210*b*, and the terminal 3 receives the data "<terminal 3-2>" via the antennas 310*a* and 310*b*.

Next, the terminal 2 transmits the data "<Ack1>" from the antennas 210*a* and 210*b*, in order to notify the terminal 1 that the data "<terminal 2-2>" has been received successfully. The terminal 1 receives the data "<Ack1>" transmitted from the terminal 2, via the antennas 110*a* and 110*b*.

Next, in response to the reception of the data "<Ack1>" sent back from the terminal 2, the terminal 1 transmits the data "<terminal 2-3>" for the terminal 2 and the data "<terminal 3-3>" for the terminal 3 from the antennas 110*a* and 110*b*. Here, the terminal 2 fails to receive the data "<terminal 2-3>" due to some reason such as noise, and a reception error occurs. On the other hand, the terminal 3 receives the data "<terminal 3-3>" via the antennas 310*a* and 310*b*.

The terminal 2 does not send the data "<Ack1>" back to the terminal 1, because the data "<terminal 2-3>" transmitted from the terminal 1 has not been received correctly. Although the terminal 1 is waiting for the transmission of the data "<Ack1>" from the terminal 2, if the data "<Ack1>" is not transmitted for a predetermined time, the terminal 1 performs time out processing and proceeds to the next operation.

Next, the terminal 1 transmits only the data "<terminal 3-4>" for the terminal 3 from the antennas 110*a* and 110*b*. The terminal 3 receives the data "<terminal 3-4>" via the antennas 310*a* and 310*b*. Next, the terminal 3 transmits the data "<BlockAck1>" from the antennas 310*a* and 310*b*, in order to notify the terminal 1 that the data "<terminal 3-1>" to "<terminal 3-4>" have been received successfully. The terminal 1 receives the data "<BlockAck1>" transmitted from the terminal 3, via the antennas 110*a* and 110*b*. Note that, in some cases, the terminal 2 may receive the data "<terminal 3-4>" via the antennas 210a and 210b. However, this is not the data addressed to the terminal 2. Therefore, even if the terminal 2 receives the data "<terminal 3-4>", the terminal 2 disregards or discards that data.

Then, the terminal 1 retransmits, from the antennas 110a and 110b, the data "<terminal 2-3>" for the terminal 2 that has not been received correctly by the terminal 2 due to a transmission error. Further, the terminal 1 transmits the data "<terminal 3-5>" for the terminal 3 simultaneously from the antennas 110a and 110b. The terminal 2 receives the data "<terminal 2-3>" via the antennas 210a and 210b, and the terminal 3 receives the data "<terminal 3-5>" via the antennas 310a and 310b.

This time, the terminal 2 receives the data "<terminal 2-3>" correctly. Therefore, the terminal 2 transmits the data "<Ack1>" from the antennas 210a and 210b, in order to notify the terminal 1 that the data "<terminal 2-3>" has been received successfully. The terminal 1 receives the data "<Ack1>" transmitted from the terminal 2, via the antennas 110a and 110b.

Note that, in the example shown in FIG. 4, the terminal 2 may receive the data "<BlockAck1>" transmitted by the terminal 3 for the terminal 1. However, in this case, the terminal 2 disregards or discards that data. Further, the terminal 3 may receive the data "<Ack1>" transmitted by the terminal 2 for the terminal 1. Similarly, in this case, the terminal 3 disregards or discards that data.

In this manner, in the wireless communication system according to the embodiment of the present invention, if a reception error occurs at the transmission destination, whether to retransmit data or to transmit data only to another terminal can be determined based on the timing of the occurrence of the reception error.

Figure 5:
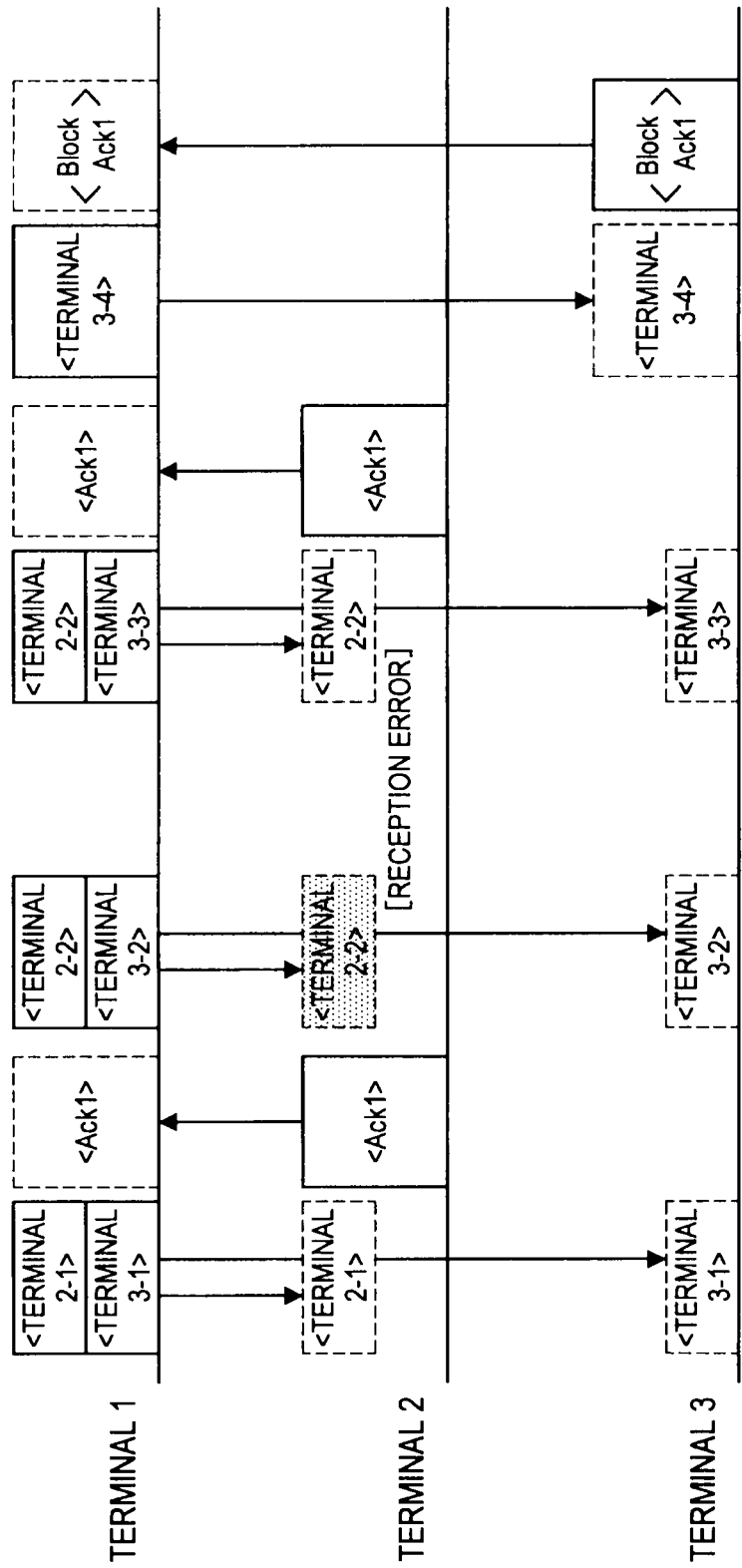
FIG. 5 is an explanatory diagram illustrating an example of the transmission/reception timing relationship in the wireless communication system according to the embodiment of the present invention.

The other example of the transmission/reception timing relationship in the wireless communication system according to the embodiment of the present invention is explained above with reference to FIG. 4. Next, yet another transmission/reception timing relationship will be explained. FIG. 5 is an explanatory diagram illustrating yet another example of the transmission/reception timing relationship in the wireless communication system according to the embodiment of the present invention. Hereinafter, the transmission/reception timing relationship in the wireless communication system according to the embodiment of the present invention will be explained with reference to FIG. 5.

A notation system used in FIG. 5 is the same as the notation system used in FIG. 3 and FIG. 4, and a detailed explanation is therefore omitted. FIG. 5 illustrates another example of the case in which a reception error occurs in a portion of data in the transmission/reception timing relationship shown in FIG. 3.

Next, referring to FIG. 5, the transmission/reception timing relationship in the wireless communication system according to the embodiment of the present invention will be explained as a time series.

First, the terminal 1 transmits data including the data "<terminal 2-1>" for the terminal 2 and the data "<terminal 3-1>" for the terminal 3 from the antennas 110a and 110b. The terminal 2 receives the data "<terminal 2-1>" via the antennas 210a and 210b, and the terminal 3 receives the data "<terminal 3-1>" via the antennas 310a and 310b. At this time, the MIMO reception operation portion 240 of the terminal 2 (the receiver 200) disregards or discards the data addressed to the terminal 3 (the receiver 300), and the MIMO reception operation portion 340 of the terminal 3 disregards or discards the data addressed to the terminal 2.

Next, the terminal 2 transmits the data "<Ack1>" from the antennas 210a and 210b, in order to notify the terminal 1 that the data "<terminal 2-1>" has been received successfully. The terminal 1 receives the data "<Ack1>" transmitted from the terminal 2, via the antennas 110a and 110b.

In response to the reception of the data "<Ack1>" sent back from the terminal 2, continuously, the terminal 1 transmits the data "<terminal 2-2>" for the terminal 2 and the data "<terminal 3-2>" for the terminal 3 from the antennas 110a and 110b. Here, the terminal 2 fails to receive the data "<terminal 2-2>" due to some reason such as noise. On the other hand, the terminal 3 receives the data "<terminal 3-2>" via the antennas 310a and 310b.

The terminal 2 does not send the data "<Ack1>" back to the terminal 1, because the data "<terminal 2-2>" transmitted from the terminal 1 has not been received correctly. Although the terminal 1 is waiting for the transmission of the data "<Ack1>" from the terminal 2, if the data "<Ack1>" is not transmitted for a predetermined time, the terminal 1 performs time out processing and proceeds to the next operation.

Continuously, the terminal 1 transmits data to the terminal 2 and the terminal 3.

However, the data "<terminal 2-2>" to be transmitted to the terminal 2 from the terminal 1 has not been transmitted successfully. Therefore, the terminal 1 retransmits the data "<terminal 2-2>" for the terminal 2 from the antennas 110a and 110b. At the same time, the terminal 1 transmits the data "<terminal 3-3>" for the terminal 3 from the antennas 110a and 110b. The terminal 2 receives the data "<terminal 2-2>" via the antennas 210a and 210b, and the terminal 3 receives the data "<terminal 3-3>" via the antennas 310a and 310b.

This time, the terminal 2 has received the data "<terminal 2-2>" correctly. Therefore, the terminal 2 transmits the data "<Ack1>" from the antennas 210a and 210b, in order to notify the terminal 1 that the data "<terminal 2-2>" has been received successfully. The terminal 1 receives the data "<Ack1>" transmitted from the terminal 2, via the antennas 110a and 110b.

Next, in response to the reception of the data "<Ack1>" sent back from the terminal 2, the terminal 1 transmits only the data "<terminal 3-4>" for the terminal 3 from the antennas 110a and 110b. The terminal 3 receives the data "<terminal 3-4>" via the antennas 310a and 310b. Next, the terminal 3 transmits the data "<BlockAck1>" from the antennas 310a and 310b, in order to notify the terminal 1 that the data "<terminal 3-1>" to "<terminal 3-4>" have been received successfully. The terminal 1 receives the data "<BlockAck1>" transmitted from the terminal 3, via the antennas 110a and 110b. Note that, in some cases, the terminal 2 may receive the data "<terminal 3-4>" via the antennas 210a and 210b. However, this is not the data addressed to the terminal 2. Therefore, even if the terminal 2 receives the data "<terminal 3-4>", the terminal 2 disregards or discards that data.

Specific operations will be explained separately for each terminal.

When data transmission to the terminal 2 fails, the terminal 1 performs processing for retransmission to the terminal 2, independently from transmission to the terminal 3 (without being affected by the order of the signal series based on the packet number), and performs data transmission to the terminal 3 following the previous transmission. Note that the terminal 1 may perform the same processing also when retransmission to the terminal 3 occurs by the data "BlockAck" from the terminal 3.

In this manner, in the wireless communication system according to the embodiment of the present invention, if a reception error occurs at the transmission destination, whether to retransmit data concurrently with data transmission to another terminal, or to transmit data only to the other terminal can be determined based on the timing of the occurrence of the reception error.

Figure 6:
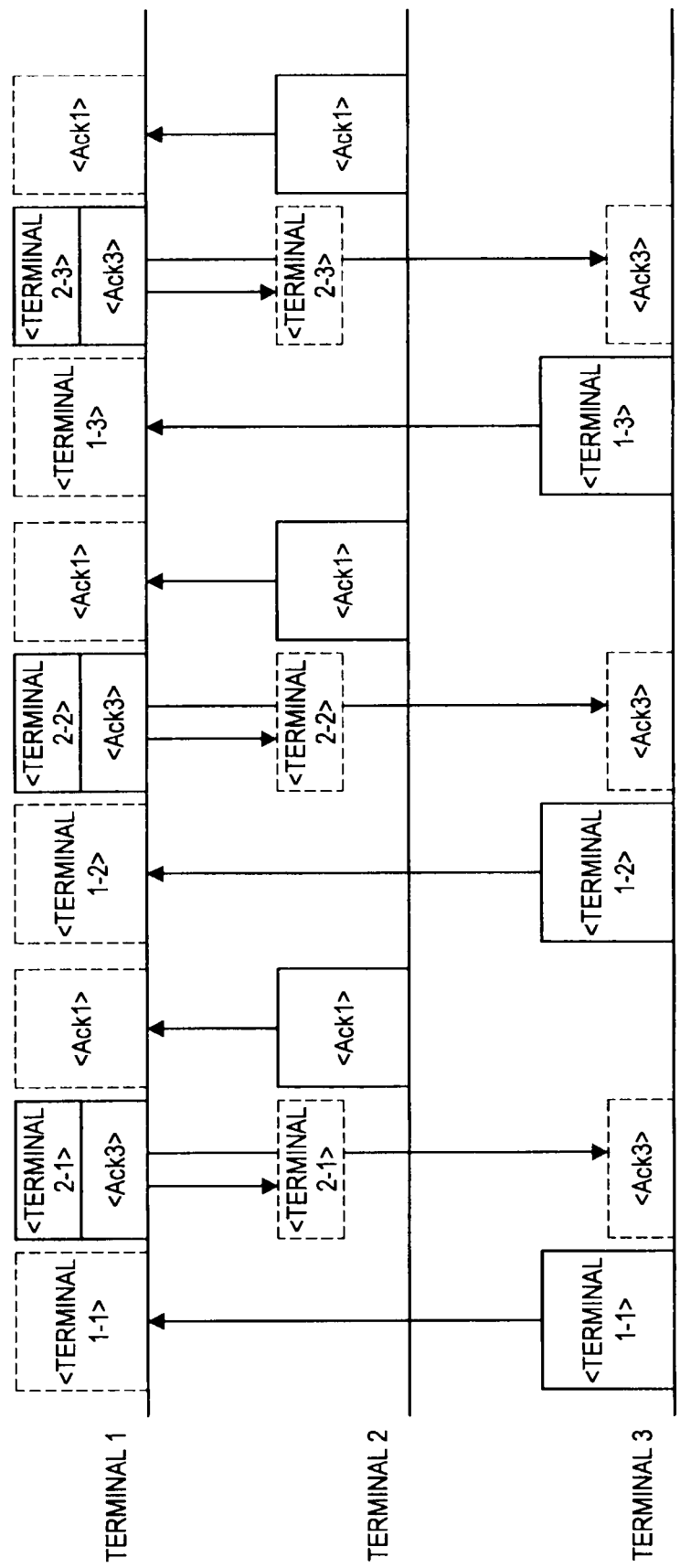
FIG. 6 is an explanatory diagram illustrating an example of the transmission/reception timing relationship in the wireless communication system according to the embodiment of the present invention.

The yet another example of the transmission/reception timing relationship in the wireless communication system according to the embodiment of the present invention is explained above with reference to FIG. 5. Next, a further transmission/reception timing relationship will be explained. FIG. 6 is an explanatory diagram illustrating a further example of the transmission/reception timing relationship in the wireless communication system according to the embodiment of the present invention. Hereinafter, the transmission/reception timing relationship in the wireless communication system according to the embodiment of the present invention will be explained with reference to FIG. 6.

A notation system used in FIG. 6 is the same as the notation system used in FIG. 3 to FIG. 5, and a detailed explanation is therefore omitted. FIG. 6 illustrates a case in which data is transmitted from the terminal 3 to the terminal 1, and the terminal 1 sends data back to the terminal 3 at the same time as transmitting data to the terminal 2.

Next, referring to FIG. 6, the transmission/reception timing relationship in the wireless communication system according to the embodiment of the present invention will be explained as a time series.

First, the terminal 3 transmits the data "<terminal 1-1>" for the terminal 1 from the antennas 310a and 310b. The terminal 1 receives the data "<terminal 1-1>" transmitted from the terminal 3 via the antennas 110a and 110b.

The terminal 1 transmits the data "<Ack3>" from the antennas 110a and 110b, in order to notify the terminal 3 that the data "<terminal 1-1>" transmitted from the terminal 3 has been received correctly. At the same time, the terminal 1 transmits the data "<terminal 2-1>" for the terminal 2 from the antennas 110a and 110b.

The terminal 2 receives the data "<terminal 2-1>" transmitted from the terminal 1, via the antennas 210a and 210b. The terminal 3 receives the data "<Ack3>" sent back from the terminal 1, via the antennas 310a and 310b. Then, the terminal 2 transmits the data "<Ack1>" from the antennas 210a and 210b, in order to notify the terminal 1 that the data "<terminal 2-1>" transmitted from the terminal 1 has been received successfully. The terminal 1 receives the data "<Ack1>" transmitted from the terminal 2, via the antennas 110a and 110b.

Next, in response to the reception of the data "<Ack3>" sent back from the terminal 1, the terminal 3 transmits the data "<terminal 1-2>" for the terminal 1 from the antennas 310a and 310b. The terminal 1 receives the data "<terminal 1-2>" transmitted from the terminal 3 via the antennas 110a and 110b.

The terminal 1 transmits the data "<Ack3>" from the antennas 110a and 110b, in order to notify the terminal 3 that the data "<terminal 1-2>" transmitted from the terminal 3 has been received correctly. At the same time, in response to the reception of the data "<Ack1>" sent back from the terminal 2, the terminal 1 transmits the data "<terminal 2-2>" for the terminal 2 from the antennas 110a and 110b.

The terminal 2 receives the data "<terminal 2-2>" transmitted from the terminal 1, via the antennas 210a and 210b. The terminal 3 receives the data "<Ack3>" sent back from the terminal 1, via the antennas 310a and 310b. Then, the terminal 2 transmits the data "<Ack1>" from the antennas 210a and 210b, in order to notify the terminal 1 that the data "<terminal 2-2>" transmitted from the terminal 1 has been received successfully. The terminal 1 receives the data "<Ack1>" transmitted from the terminal 2, via the antennas 110a and 110b.

Next, in response to the reception of the data "<Ack3>" sent back from the terminal 1, the terminal 3 transmits the data "<terminal 1-3>" for the terminal 1 from the antennas 310a and 310b. The terminal 1 receives the data "<terminal 1-3>" transmitted from the terminal 3, via the antennas 110a and 110b.

The terminal 1 transmits the data "<Ack3>" from the antennas 110a and 110b, in order to notify the terminal 3 that the data "<terminal 1-3>" transmitted from the terminal 3 has been received correctly. At the same time, in response to the reception of the data "<Ack1>" sent back from the terminal 2, the terminal 1 transmits the data "<terminal 2-3>" for the terminal 2 from the antennas 110a and 110b.

The terminal 2 receives the data "<terminal 2-3>" transmitted from the terminal 1, via the antennas 210a and 210b. The terminal 3 receives the data "<Ack3>" sent back from the terminal 1, via the antennas 310a and 310b. Then, the terminal 2 transmits the data "<Ack1>" from the antennas 210a and 210b, in order to notify the terminal 1 that the data "<terminal 2-3>" transmitted from the terminal 1 has been received successfully. The terminal 1 receives the data "<Ack1>" transmitted from the terminal 2, via the antennas 110a and 110b.

Specific operations will be explained separately for each terminal.

At the terminal 1, the general protocol, the "method to transmit the next data when Ack is received" is used for data transmission to the terminal 2. Further, the general protocol, the "method to send back Ack when data is received successfully" is used for data reception from the terminal 3. However, unlike the known wireless communication system, when the terminal itself transmits the data "Ack", it generates a transmission signal by combining simultaneous data transmission to another terminal.

The terminal 2 performs reception processing on the signals transmitted from the terminal 1, and while extracting only the data $S_0$ addressed to the terminal itself, the terminal 2 sequentially sends back Ack indicating successful reception. Note that, in FIG. 6, when data that is not addressed to the terminal itself is transmitted, for example, when the data "<terminal 1-*>" is transmitted, the terminal 2 remains in a standby state in a similar manner to the existing operation.

At the terminal 3, the general protocol, the "method to transmit the next data when Ack is received" is used for data transmission to the terminal 1.

With the use of the transmission/reception timing relationship in the wireless communication system according to the embodiment of the present invention shown in FIG. 6, data transmission to another terminal can be performed at the transmission timing when the data "Ack" is sent back. Thus, it is possible to eliminate waiting time for avoiding interference. Particularly, when the modulation schemes assigned to the data $S_0$ and $S_1$ for the terminal 2 are significantly different from each other (for example, when $S_0 > S_1$), even if the data "Ack" for the terminal 3 is assigned to the data $S_1$, reduction in the transmission rate per packet for the terminal 2 is suppressed. Further, with the use of the transmission/reception timing relationship in the wireless communication system according to the embodiment of the present invention, it is possible to perform data transmission at shorter intervals. Thus, frequency use efficiency is expected to be improved.

Figure 7:
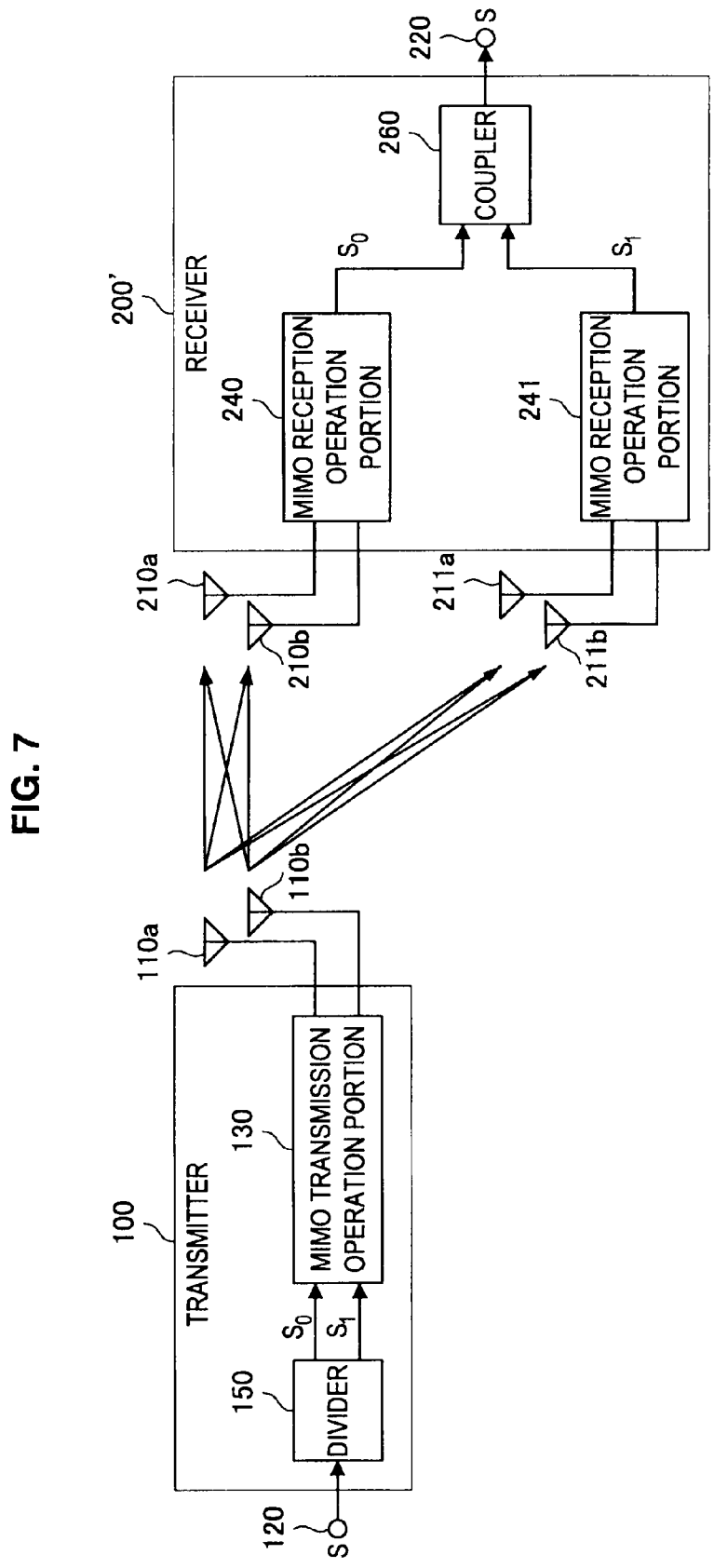
FIG. 7 is an explanatory diagram illustrating a modified example of the wireless communication system according to the embodiment of the present invention.

The further example of the transmission/reception timing relationship in the wireless communication system according to the embodiment of the present invention is explained above with reference to FIG. 6. Next, a modified example of the wireless communication system according to the embodiment of the present invention will be explained. FIG. 7 is an explanatory diagram illustrating a modified example of the wireless communication system according to the embodiment of the present invention. Hereinafter, the modified example of the wireless communication system according to the embodiment of the present invention will be explained with reference to FIG. 7.

3. Explanation of a Modified Example of the Wireless Communication System According to the Embodiment of the Present Invention As shown in FIG. 7, the modified example of the wireless communication system according to the embodiment of the present invention includes the transmitter 100 and a receiver 200'.

The receiver 200' includes the antennas 210a and 210b, antennas 211a and 211b, the data input/output terminal 220, the MIMO reception operation portion 240, a MIMO reception operation portion 241, and a coupler 260.

Here, referring to FIG. 7, a connection relationship of the receiver 200' will be explained. The antennas 210a and 210b are connected to the MIMO reception operation portion 240 provided inside the receiver 200'. The antennas 211a and 211b are connected to the MIMO reception operation portion 241 provided inside the receiver 200'. The MIMO reception operation portions 240 and 241 are connected to the coupler 260. The coupler 260 is connected to the data input/output terminal 220.

Next operations of the transmitter 100 and the receiver 200' will be explained.

In the transmitter 100, data S for transmitting to the receiver 200' is input to a divider 150 provided inside the transmitter 100. The divider 150 divides the data S into data $S_0$ and data $S_1$ based on the ratio between a modulation scheme for $S_0$ and a modulation scheme for $S_1$. The modulation scheme for $S_0$ is derived in advance by the channel matrix H between the transmitter 100 and the receiver 200' on the MIMO reception processing portion 240 side. The modulation scheme for $S_1$ is determined separately in advance between the transmitter 100 and the receiver 200' on the MIMO reception processing portion 241 side. The data $S_0$ and the data $S_1$ divided by the divider 150 are sent to the MIMO transmission operation portion 130.

The MIMO transmission operation portion 130 performs matrix operation processing on the data $S_0$ that is mapped according to the modulation scheme assigned based on the concept of the SVD-MIMO system, using the matrix V that is obtained in advance by performing the singular value decomposition of the channel matrix H between the transmitter 100 and the receiver 200' on the MIMO reception operation portion 240 side. At the same time, the MIMO transmission operation portion 130 performs the matrix operation processing, using the matrix V, also on the data $S_1$ that is mapped according to the modulation scheme that is determined separately in advance between the transmitter 100 and the receiver 200' on the MIMO reception operation portion 241 side. The MIMO transmission operation portion 130 generates transmission signals x' to be transmitted from the antennas 110a and 110b, by performing the matrix operation processing. The transmission signals x' generated by the MIMO transmission operation portion 130 are sent to the antennas 110a and 110b, and output to wireless transmission paths.

The receiver 200' on the MIMO reception operation portion 240 side sends, to the MIMO reception operation portion 240, received signals $y_0'$ that are received by the antennas 210a and 210b through the wireless communication paths. The MIMO reception operation portion 240 performs matrix operation processing on the input received signals $y_0'$, using the matrix U that is obtained in advance by performing the singular value decomposition of the channel matrix H between the transmitter 100 and the receiver 200' on the MIMO reception operation portion 240 side (or using an inverse matrix calculated from the received signals $y_0'$). Then, among the data obtained as a result of the matrix operation processing performed by the MIMO reception operation portion 240, the MIMO reception operation portion 240 outputs, to the coupler 260, only the data $S_0$ that is data addressed to the receiver 200' on the MIMO reception operation portion 240 side.

Further, the receiver 200' on the MIMO reception operation portion 241 side sends, to the MIMO reception operation portion 241, received signals $y_1'$ that are received by the antennas 211a and 211b through the wireless communication paths. The MIMO reception operation portion 241 performs matrix operation processing on the input received signals $y_1'$, using an inverse matrix calculated from the received signals $y_1'$. Among the data obtained as a result of the matrix operation processing performed by the MIMO reception operation portion 241, the MIMO reception operation portion 241 outputs, to the coupler 260, only the data $S_1$ that is data addressed to the receiver 200' on the MIMO reception operation portion 241 side.

The coupler 260 combines the data series of the data $S_0$ input from the MIMO reception operation portion 240 and the data $S_1$ input from the MIMO reception operation portion 241, in accordance with the ratio between the modulation schemes used for modulating the data S0 and the data S1, respectively. The obtained data that has been combined by the coupler 260 is output to the data input/output terminal 220.

It should be noted herein that, when only the data $S_0$ that is the data addressed to the receiver 200' on the MIMO reception operation portion 240 side is output by, for example, the transmitter 100, data that describes identification information indicating that the data $S_0$ is addressed to the receiver 200' on the MIMO reception operation portion 240 side may be added to the beginning portion of the data $S_0$. In a similar way, when only the data $S_1$ that is the data addressed to the receiver 200' on the MIMO reception operation portion 241 side is output, data that describes identification information indicating that the data $S_1$ is addressed to the receiver 200' on the MIMO reception operation portion 241 side may be added to the beginning portion of the data $S_1$.

The configuration of the modified example of the wireless communication system according to the embodiment of the present invention is described above. The above-described operation of the wireless communication system according to the embodiment of the present invention can be applied as it is to the modified example of the wireless communication system according to the embodiment of the present invention shown in FIG. 7. More specifically, if the receiver 200' on the MIMO reception operation portion 240 side is taken as the receiver 200 shown in FIG. 1, and the receiver 200' on the MIMO reception operation portion 241 side is taken as the receiver 300 shown in FIG. 1, the above-described operation of the wireless communication system according to the embodiment of the present invention can be applied as it is. Moreover, when the receiver 200' sends the data "Ack" back to the transmitter 100, the data "Ack1" indicating correct reception by the MIMO reception operation portion 240 and the data "BlockAck1" indicating correct reception by the MIMO reception operation portion 241 may be shared in the receiver 200' so as to combine each other's information, and the receiver 200' may transmit the combined data from the antennas 210a and 210b or from the antennas 211a and 211b.

Note that, in the present embodiment, one transmitter and two receivers are provided and two data streams are used for explanation. However, it is needless to mention that the present invention is not limited to this example. Further, it is needless to mention that the number of the antennas of the transmitter 100 or the receivers 200 and 300 is not limited to two. Furthermore, in the present embodiment, error correction processing may be performed on the two data streams at an appropriate point (for example, in the divider 150 or the coupler 260).

Moreover, the operations of the transmitter 100 and the receivers 200 and 300 according to the embodiment of the present invention may be performed such that a read only memory (ROM) and another storage medium that store computer programs are provided inside the transmitter 100 and the receivers 200 and 300, and a central processing unit (CPU) and another control unit provided inside the transmitter 100 and the receivers 200 and 300 sequentially read and execute the computer programs.

4. Conclusion

As described above, the wireless communication system according to the embodiment of the present invention makes it possible to simultaneously transmit different data to a plurality of terminals on the receiving side. Thus, transmission power can be used for data transmission more efficiently. In addition, it is possible to form an efficient communication protocol, while achieving efficient data transmission. Therefore, the wireless communication system according to the embodiment of the present invention makes it possible to improve communication quality and communication efficiency, as compared to the known wireless communication system.

The present application contains subject matter related to that disclosed in Japanese Priority Patent Application JP 2008-264110 filed in the Japan Patent Office on Oct. 10, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system, comprising:
a first terminal equipped with N antennas, N being an integer of at least two;
a second terminal equipped with M antennas, M being an integer of at least one; and
a third terminal equipped with L antennas, L being an integer of at least one,
wherein the first terminal comprises a matrix calculation portion that calculates a transmission weight matrix suitable for transmitting data from the first terminal to the second terminal, and
a matrix multiplication portion that multiplies a first data stream and a second data stream by the transmission weight matrix, the first data stream being transmitted from the first terminal to the second terminal, and the second data stream being transmitted from the first terminal to the third terminal,
wherein the first data stream is received by the second terminal and the second data stream is also received by the second terminal and combined and used,
wherein information from the second terminal indicating that data has been received correctly, and information from the third terminal indicating that data has been received correctly are shared by each other, and the information comprising information of a sharing counterpart is transmitted from one of the M antennas and the L antennas.

2. The wireless communication system according to claim 1, wherein the first data stream is mapped according to a modulation scheme assigned based on a singular value decomposition (SVD)—multi-input multi-output (MIMO) system, and
the second data stream is mapped according to a modulation scheme determined in advance between the first terminal and the third terminal.

3. The wireless communication system according to claim 1, wherein the first terminal transmits, once in a plurality of times, only data addressed to the third terminal.

4. The wireless communication system according to claim 1, wherein the third terminal sends back, to the first terminal, information indicating that data has been received correctly, collectively for a plurality of data.

5. The wireless communication system according to claim 1, wherein the third terminal sends back, to the first terminal, information indicating that data has been received correctly, collectively for a plurality of data, at a time point when the first terminal transmits only data addressed to the third terminal.

6. The wireless communication system according to claim 1, wherein based on information from the third terminal indicating that data has been received correctly, the first terminal preferentially retransmits data that has not been received by the third terminal.

7. A wireless communication device, comprising:
N antennas, N being an integer of at least two;
a matrix calculation portion that calculates a transmission weight matrix suitable for transmitting data to a first terminal equipped with M antennas, M being an integer of at least one; and
a matrix multiplication portion that multiplies a first data stream and a second data stream by the transmission weight matrix, the first data stream being transmitted to the first terminal, and the second data stream being transmitted to a second terminal equipped with L antennas, L being an integer of at least one,
wherein the first data stream is received by the second terminal and the second data stream is received by the second terminal and combined and used,
wherein information from the first terminal and the second terminal indicating that data has been received correctly is shared with each other from one of the M antennas and one of the L antennas respectively.

8. The wireless communication device according to claim 7, wherein
the first data stream is mapped according to a modulation scheme assigned based on an SVD-MIMO system, and
the second data stream is mapped according to a modulation scheme determined in advance with the second terminal.

9. The wireless communication device according to claim 7, wherein the N antennas transmit, once in a plurality of times, only data addressed to the second terminal.

10. The wireless communication device according to claim 7, wherein based on information from the second terminal indicating that data has been received correctly, the N antennas preferentially retransmit data that has not been received by the second terminal.

11. A wireless communication method, comprising:
calculating a transmission weight matrix suitable for transmitting data from N antennas, N being an integer of at least two, to a first terminal equipped with M antennas, M being an integer of at least one; and multiplying a first data stream and a second data stream by the transmission weight matrix, the first data stream being transmitted to the first terminal, the second data stream being transmitted to a second terminal equipped with L antennas, L being an integer of at least one, wherein the first data stream is received by the second terminal and the second data stream is received by the second terminal and combined and used, wherein information from the first terminal and the second terminal indicating that data has been received correctly is shared with each other from one of the M antennas and one of the L antennas respectively.

12. A non-transitory computer program storage medium having stored thereon, a computer program having at least one code section for communication, the at least one code section being executable by a computer for causing the computer to perform steps comprising:

calculating a transmission weight matrix suitable for transmitting data from N antennas, N being an integer of at least two, to a first terminal equipped with M antennas, M being an integer of at least one; and multiplying a first data stream and a second data stream by the transmission weight matrix, the first data stream being transmitted to the first terminal, the second data stream being transmitted to a second terminal equipped with L antennas, L being an integer of at least one wherein the first data stream received by the second terminal and the second data stream received by the second terminal are combined and used, wherein information from the first terminal and the second terminal indicating that data has been received correctly is shared with each other from one of the M antennas and one of the L antennas.

* * * * *